United States Patent
Ng

(10) Patent No.: US 9,794,960 B2
(45) Date of Patent: Oct. 17, 2017

(54) METHODS AND APPARATUS FOR UPLINK CHANNEL ACCESS AND TRANSMISSIONS FOR LTE ON UNLICENSED SPECTRUM

(71) Applicant: Samsung Electronics Co., Ltd, Suwon-si (KR)

(72) Inventor: Boon Loong Ng, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 14/981,150

(22) Filed: Dec. 28, 2015

(65) Prior Publication Data

US 2016/0192396 A1    Jun. 30, 2016

Related U.S. Application Data

(60) Provisional application No. 62/098,853, filed on Dec. 31, 2014.

(51) Int. Cl.
   *H04W 74/08*    (2009.01)
   *H04W 16/14*    (2009.01)
   *H04W 72/04*    (2009.01)
   *H04W 72/12*    (2009.01)

(52) U.S. Cl.
   CPC ....... *H04W 74/0808* (2013.01); *H04W 16/14* (2013.01); *H04W 72/1289* (2013.01)

(58) Field of Classification Search
   CPC . H04W 16/14; H04W 72/04; H04W 72/1215; H04W 72/1289; H04W 74/0816; H04W 88/06; H04W 24/02; H04W 74/0808; H04W 76/025; H04L 5/0098
   See application file for complete search history.

(56) References Cited

U.S. PATENT DOCUMENTS

| | | | |
|---|---|---|---|
| 9,565,568 B2* | 2/2017 | Suzuki | H04W 16/14 |
| 9,655,048 B2* | 5/2017 | Liu | H04W 52/0229 |
| 2013/0208587 A1* | 8/2013 | Bala | H04W 16/14 370/230 |
| 2013/0242897 A1 | 9/2013 | Meylan et al. | |
| 2014/0204850 A1 | 7/2014 | Kim et al. | |

(Continued)

FOREIGN PATENT DOCUMENTS

| WO | WO 2014/189912 | 11/2014 |
|---|---|---|
| WO | WO 2014/200951 | 12/2014 |

OTHER PUBLICATIONS

International Search Report and Written Opinion issued for PCT/KR2015/014417 dated Apr. 22, 2016, 9 pgs.

(Continued)

*Primary Examiner* — Ahmed Elallam

(57) ABSTRACT

Methods and apparatuses for efficient data transmission in a wireless communication system. A method includes receiving a predefined downlink-uplink (DL-UL) subframe configuration from an eNodeB (eNB), wherein the eNB cooperates with at least one neighbor eNB that belongs to an asynchronous licensed assisted access (LAA) cell operating on at least one LAA carrier. The method further includes performing a listen before talk (LBT) procedure before transmitting UL data in the at least one LAA carrier and transmitting the UL data in accordance with the LBT procedure based on the DL-UL subframe configuration.

20 Claims, 11 Drawing Sheets

(56) References Cited

U.S. PATENT DOCUMENTS

| | | | | |
|---|---|---|---|---|
| 2014/0341207 | A1* | 11/2014 | Bhushan | H04W 28/0289 370/350 |
| 2015/0289208 | A1* | 10/2015 | Liu | H04W 52/0229 370/252 |
| 2017/0005775 | A1* | 1/2017 | Cheng | H04L 5/0098 |
| 2017/0094681 | A1* | 3/2017 | Takeda | H04W 16/14 |

OTHER PUBLICATIONS

Alcatel-Lucent, "LBT Enhancements for Licensed-Assisted Access", R1-144701, 3GPP TSG RAN WG1 Meeting #79, Nov. 8, 2014, 5 pgs.

LTE; Evolved Universal Terrestrial Radio Access (E-UTRA); Physical channels and modulation; ETSI TS 136 211 V12.3.0; /2014 pp. 124.

LTE; Evolved Universal Terrestrial Radio Access (U-UTRA); Multiplexing and channel coding (3GPP TS 36.212 version 12.2.0 Release 12); ETSI TS 136 212 V12.2.0; Oct. 2015; pp. 91.

LTE; Evolved Universal Terrestrial Radio Access (E-UTRA); Physical layer procedures (3GPP TS 36.213 version 12.3.0 Release 12); ETSI TS 136 213 V12.3.0; Oct. 2014—pp. 214.

3GPP TR 36.872 Small cell enhancements for E-UTRA and E-UTRAN—Physical layer aspects; http://www.3gpp.org/dynareport/36872.htm[Dec. 16, 2015 9:45:39 AM]—pp. 2.

LTE; Evolved Universal Terrestrial Radio Access (E-UTRA); Requirements for support of radio resource management (3GPP TS 36.133 version 12.5.0 Release 12); ETSI TS 136 133 V12.5.0; Nov. 2014—879 Pages.

LTE; Evolved Universal Terrestrial Radio Access (E-UTRA); Radio Resource Control (RRC); Protocol specification (3GPP TS 36.331 version 12.3.0 Release 12); ETSI TS 136 331 V12.3.0; Sep. 2014—383 Pages.

Broadband Radio Access Networks (BRAN); 5 GHz high performance RLAN; Harmonized EN covering the essential requirements of article 3.2 of the R&TTE Directive; ETSI EN 301 893 V1.7.1; Jun. 2012—90 Pages.

* cited by examiner

METHODS AND APPARATUS FOR UPLINK CHANNEL ACCESS AND TRANSMISSIONS FOR LTE ON UNLICENSED SPECTRUM

CROSS-REFERENCE TO RELATED APPLICATION(S) AND CLAIM OF PRIORITY

This application claims priority under 35 U.S.C. §119(e) to U.S. Provisional Patent Application No. 62/098,853 filed on Dec. 31, 2014. The above-identified provisional patent application is hereby incorporated by reference in its entirety.

TECHNICAL FIELD

This disclosure relates generally to wireless communication systems. More specifically, this disclosure relates to method and apparatus for uplink channel access and transmissions for LTE on unlicensed spectrum.

BACKGROUND

A long term evolution (LTE) radio access technology (RAT) may be deployed on an unlicensed frequency spectrum, which is also known as licensed assisted access (LAA) or LTE unlicensed (LTE-U). One of possible deployment scenarios for the LAA is to deploy LAA carriers as a part of carrier aggregations, where an LAA carrier is aggregated with another carrier on a licensed frequency spectrum. In a conventional scheme, a carrier on a licensed frequency spectrum is assigned as a primary cell (PCell) and a carrier on an unlicensed frequency spectrum is assigned as a secondary cell (SCell) for a UE. Since there may be other RATs operating on the same unlicensed frequency spectrum as the LAA carrier, there is a need to enable co-existence of other RAT with LAA on an unlicensed frequency spectrum without undesirable interference between heterogeneous RATs.

SUMMARY

This disclosure provides method and apparatus for uplink channel access and transmissions for LTE on unlicensed spectrum.

In one embodiment, a user equipment (UE) is provided. The UE includes at least one processor configured to perform a listen before talk (LBT) procedure before transmitting UL data on the at least one licensed assisted access (LAA) carrier. The UE further includes a transceiver configured to receive a predefined downlink and uplink (DL-UL) subframe configuration from an eNodeB (eNB). The eNB cooperates with at least one neighbor eNB that belongs to an asynchronous LAA cell operating on the at least one LAA carrier. The UE further includes a transceiver configured to transmit the UL data in accordance with the LBT procedure based on the DL-UL subframe configuration.

In another embodiment, an eNB is provided. The eNB includes at least one processor configured to detect at least one neighbor eNB that belongs to an asynchronous LAA cell operating on at least one LAA carrier and generate a predefined DL-UL subframe configuration including a guard period. The predefined DL-UL subframe is determined by coordinating between the eNB and the at least one neighbor eNB through an X2 interfaces. The eNB further includes a transceiver configured to transmit the predefined DL-UL subframe configuration to at least one UE and receive UL data in accordance with the predefined DL-UL subframe configuration from the at least one UE.

In another embodiment, a method for efficient data transmission in a wireless communication system is provided. The method includes receiving a predefined DL-UL subframe configuration from an eNB. The eNB cooperates with at least one neighbor eNB that belongs to an asynchronous LAA cell operating on at least one LAA carrier. The method further includes performing an LBT procedure before transmitting UL data in the at least one LAA carrier and transmitting the UL data in accordance with the LBT procedure based on the DL-UL subframe configuration.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 17, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The following documents and standards descriptions are hereby incorporated by reference into the present disclosure as if fully set forth herein: 3GPP TS 36.211 v12.3.0, "E-UTRA, Physical channels and modulation" (REF1); 3GPP TS 36.212 v12.2.0, "E-UTRA, Multiplexing and Channel coding" (REF2); 3GPP TS 36.213 v12.3.0, "E-UTRA, Physical Layer Procedures" (REF3); 3GPP TR 36.872 v12.1.0, "Small cell enhancements for E-UTRA and E-UTRAN—Physical layer aspects" (REF4); 3GPP TS 36.133 v12.5.0, "E-UTRA, Requirements for support of radio resource management" (REF5); 3GPP TS 36.331 v12.3.0, "E-UTRA, Radio Resource Control (RRC) Protocol Specification"; and ETSI EN 301 893 v1.7.1 (2012-06), Harmonized European Standard, "Broadband Radio Access Networks (BRAN); 5 GHz high performance RLAN."

Figure 1:
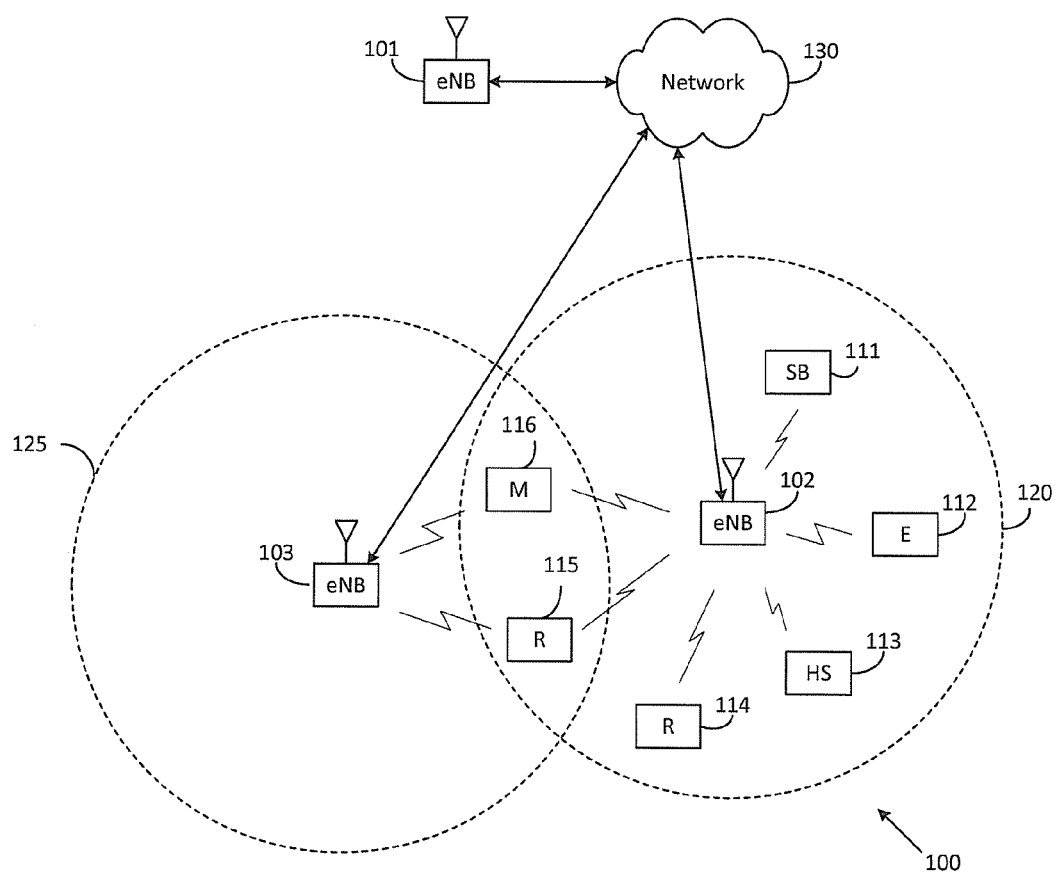
FIG. 1 illustrates an example wireless network according to embodiments of the present disclosure.
Figure 2:
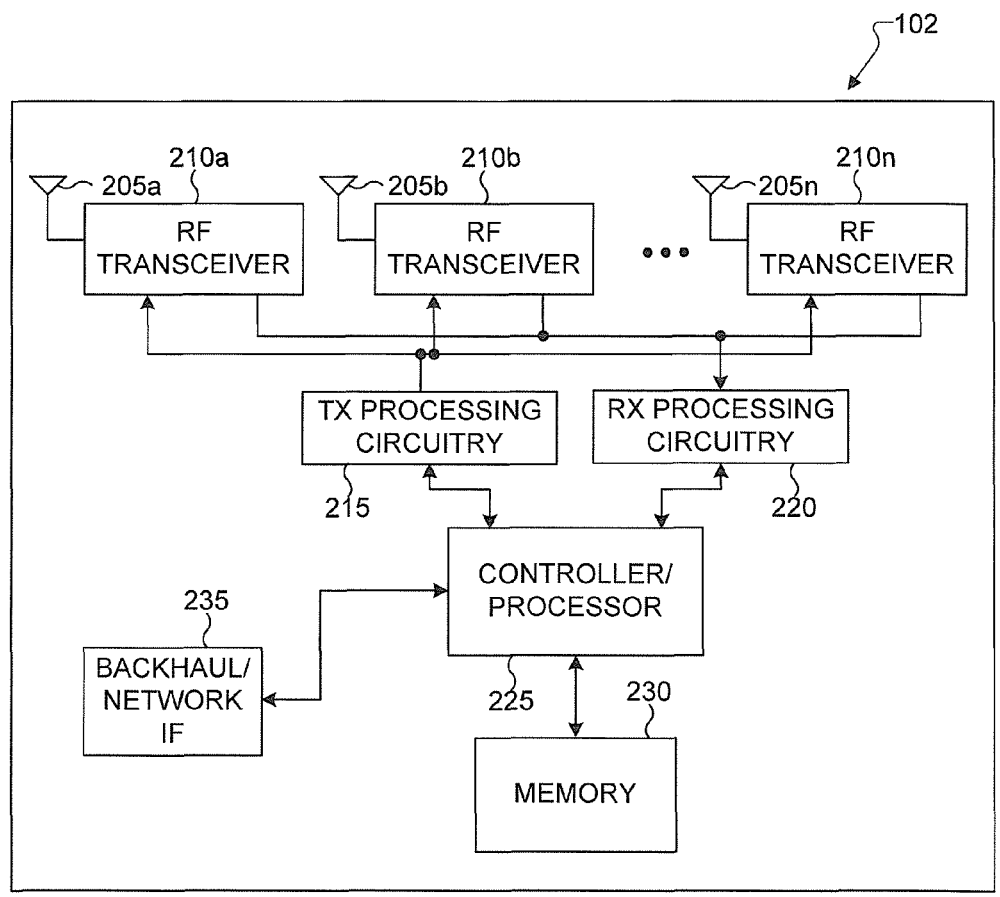
FIG. 2 illustrates an example eNodeB (eNB) according to embodiments of the present disclosure.
Figure 3:
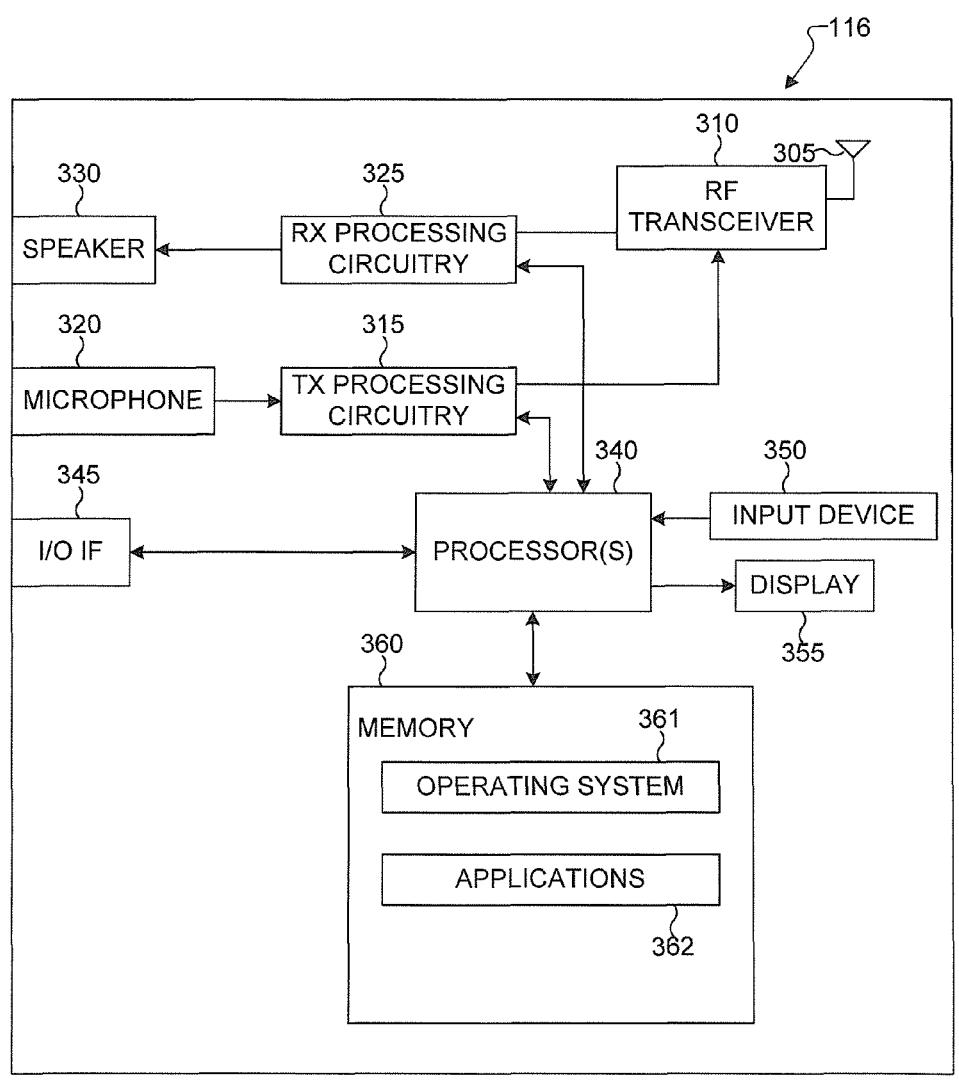
FIG. 3 illustrates an example user equipment (UE) according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, LTE-U(LAA) or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote tem final," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and manmade obstructions.

As described in more detail below, one or more of the UEs 111-116 include circuitry, programming, or a combination thereof, for processing of uplink and downlink channels on unlicensed frequency spectrum and/or licensed frequency spectrum using a carrier aggregation scheme. In certain embodiments, and one or more of the eNBs 101-103 includes circuitry, programming, or a combination thereof, for processing of uplink and downlink channels on unlicensed spectrum and/or licensed spectrum using a carrier aggregation scheme.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 includes circuitry, programming, or a combination thereof for processing of uplink and downlink channels on unlicensed spectrum and/or licensed spectrum using a carrier aggregation scheme.

For example, controller/processor 225 can be configured to execute one or more instructions, stored in memory 230, that are configured to cause the controller/processor to process uplink and downlink channels on unlicensed spectrum and/or licensed spectrum using a carrier aggregation scheme.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, LTE-A, or LTE-U(LAA))), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for uplink and downlink channels on unlicensed spectrum and/or licensed spectrum using a carrier aggregation scheme.

The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
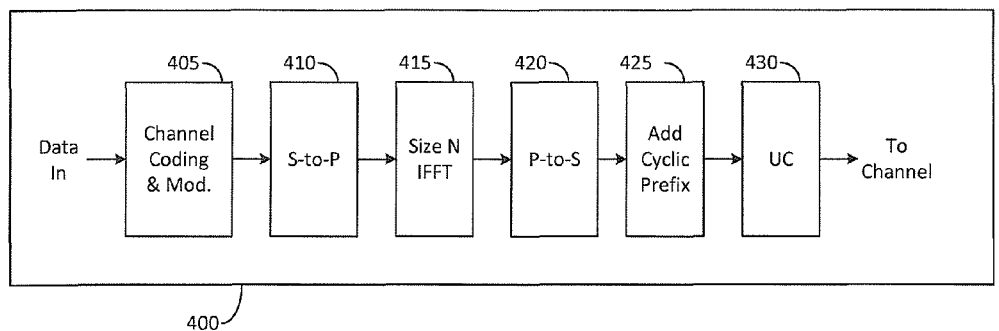
FIG. 4A illustrates a high-level diagram of an orthogonal frequency division multiple access transmit path according to embodiments of the present disclosure.
Figure 4B:
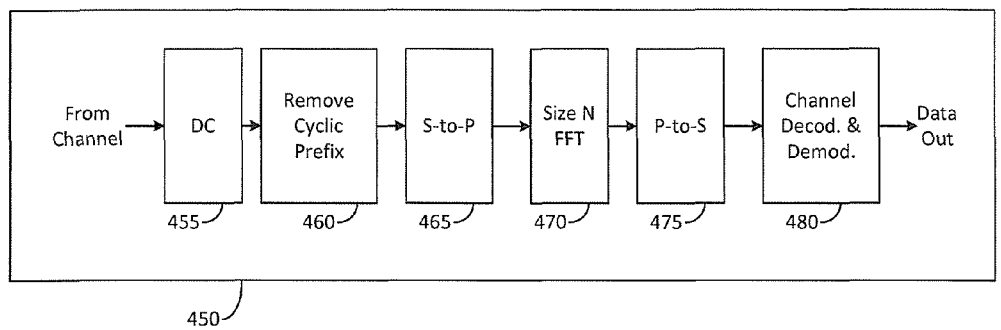
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an OFDMA communication. FIG. 4B is a high-level diagram of receive path circuitry 450. For example, the receive path circuitry 450 may be used for an OFDMA communication. In FIGS. 4A and 4B, for downlink communication, the transmit path circuitry 400 can be implemented in a base station (eNB) 102 or a relay station, and the receive path circuitry 450 may be implemented in a user equipment (such as user equipment 116 of FIG. 1). In other examples, for uplink communication, the receive path circuitry 450 can be implemented in a base station (such as 102 of FIG. 1) or a relay station, and the transmit path circuitry 400 can be implemented in a user equipment (such as user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B can be implemented in software, while other components can be implemented by configurable hardware or a mixture of software and configurable hardware. In particular, it is noted that the FFT blocks and the IFFT blocks described in this disclosure document can be implemented as configurable software algorithms, where the value of Size N can be modified according to the implementation.

In transmit path circuitry 400, channel coding and modulation block 405 receives a set of information bits, applies coding (such as low-density parity-check (LDPC) coding) and modulates (such as Quadrature Phase Shift Keying (QPSK) or Quadrature Amplitude Modulation (QAM)) the input bits to produce a sequence of frequency-domain modulation symbols. Serial-to-parallel block 410 converts (such as de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (such as multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (such as up-converts) the output of add cyclic prefix block 425 to RF frequency for transmission via a wireless channel. The signal can also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 can implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provide an LAA downlink-uplink (DL-UL) configuration for inter-operator co-existence, UL transmission configuration parameters and control signaling scheme, and a randomization of UL access for an inter-operator co-existence scheme. To achieve efficient data transmissions in a wireless communication network, more accurate and efficient uplink access procedures and configuration are needed at the eNB 103 and the UEs 111-116 operating in a licensed frequency spectrum and unlicensed frequency spectrum.

Figure 5:
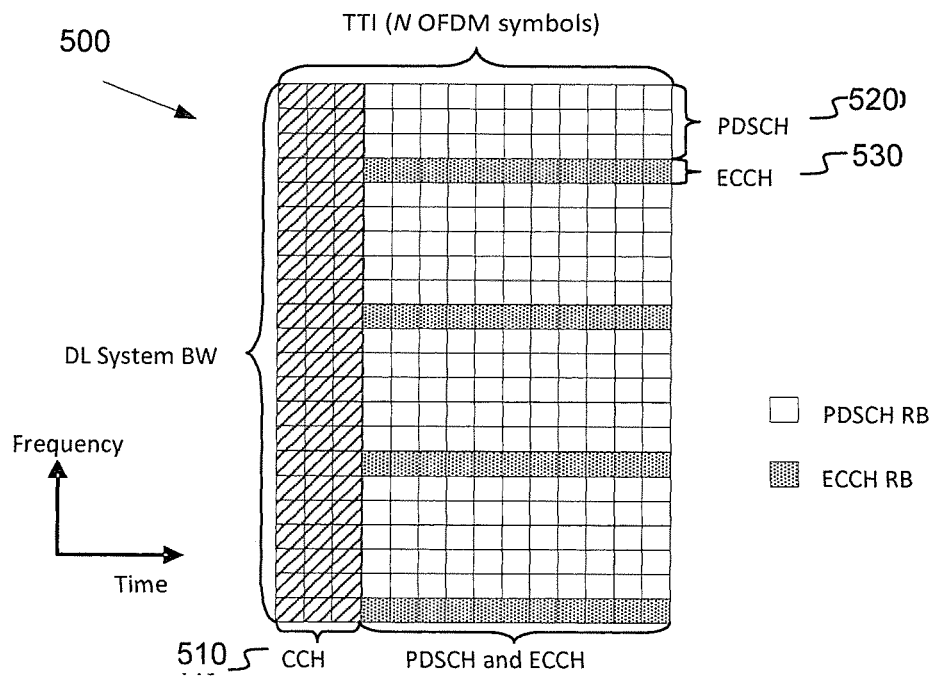
FIG. 5 illustrates an example structure for a downlink (DL) transmission time interval (TTI) according to embodiments of the present disclosure.

FIG. 5 illustrates an example structure for a downlink (DL) transmission time interval (TTI) 500 according to embodiments of the present disclosure. An embodiment of the DL transmit time interval (DL TTI) structure 500 shown in FIG. 5 is for illustration only. Other embodiments can be used without departing from the scope of the present disclosure.

As illustrated in FIG. 5, a DL signaling uses an OFDM and a DL TTI includes N=14 OFDM symbols in the time domain and K resource blocks (RBs) in the frequency domain. A first type of control channels (CCHs) is transmitted in a first $N_1$ OFDM symbols 510 including no transmission, $N_1=0$. Remaining $N-N_1$ OFDM symbols are primarily used for transmitting PDSCHs 520 and, in some RBs of a TTI, for transmitting a second type of CCHs (ECCHs) 530.

An eNB 103 also transmits primary synchronization signals (PSS) and secondary synchronization signals (SSS), so that UE 116 synchronizes with the eNB 103 and performs cell identification. There are 504 unique physical-layer cell identities. The physical-layer cell identities are grouped into 168 unique physical-layer cell-identity groups which of each group contains three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. Detecting a PSS enables a UE 116 to determine the physical-layer identity as well as a slot timing of the cell transmitting the PSS. Detecting a SSS enables the UE 116 to determine a radio frame timing, the physical-layer cell identity, a cyclic prefix length as well as the cell uses ether a frequency division duplex (FDD) or a time division duplex (TDD) scheme.

In a TDD communication system, some TTIs are used for an uplink transmission and a downlink transmission as a communication direction. Table 1 lists indicative TDD DL-UL configurations over a period of 10 TTIs that is also referred to as frame period. In Table 1, "D" denotes a DL TTI, "U" denotes a UL TTI, and "S" denotes a special TTI that includes a DL transmission field referred to as a downlink pilot time slot (DwPTS), a guard period (GP), and a UL transmission field referred to as an uplink pilot time slot (UpPTS). Several combinations exist for a duration of each field in a special TTI subject to the condition that the total duration is one TTI.

TABLE 1

| TDD DL-UL Configuration | DL-to-UL Switch-point periodicity | TTI number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The Federal Communications Commission (FCC) defined unlicensed carriers to provide cost-free public access spectrum. Use of unlicensed carriers by a UE is allowed only under the provisions that the UE does not generate noticeable interference to communications in licensed carriers and that communications in unlicensed carriers are not protected from interference. For example, unlicensed carriers include the industrial, scientific and medical (ISM) carriers and the unlicensed national information infrastructure (UNII) carriers that can be used by institute of electrical and electronics engineering 802.11 (IEEE 802.11) devices. It may be possible to deploy LTE RAT on an unlicensed frequency spectrum, which is also known as LTE-unlicensed or LTE-U or LAA.

Figure 6:
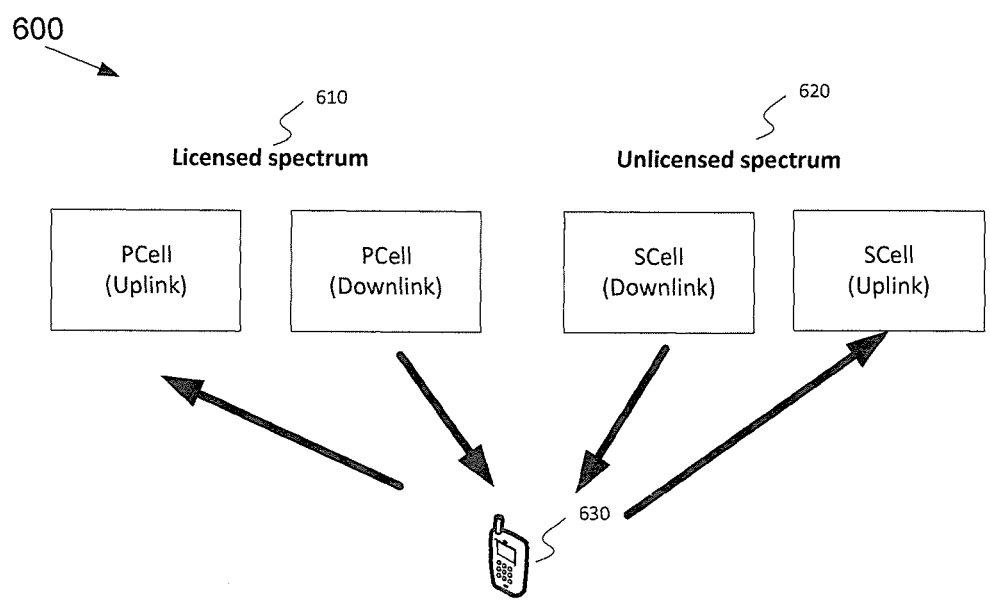
FIG. 6 illustrates an example carrier aggregation for a licensed frequency spectrum and an unlicensed frequency spectrum according to embodiments of the present disclosure.

A possible deployment scenario for LAA is to deploy an LAA carrier as a part of a carrier aggregation scheme, where the LAA carrier is aggregated with another carrier(s) on a licensed spectrum as illustrated in FIG. 6. In a conventional scheme, carrier(s) on the licensed spectrum 610 is assigned as a PCell and carrier(s) on the unlicensed spectrum 620 is assigned as a SCell for a UE 630. FIG. 6 shows an example where the LAA cell comprises of a downlink carrier with an uplink carrier. Since there may be other RATs operating on the same unlicensed frequency spectrum as the LAA carrier, there is a need to enable co-existence of other RAT with the LAA on an unlicensed frequency spectrum. A carrier sense multiple access (CSMA) may be applied, for example before a UE or an eNB transmits. In the CSMA operation, the UE or the eNB monitors a channel for a predetermined time period to determine whether there is an ongoing transmission in a channel. If no other transmission is sensed in the channel, the UE or the eNB may transmit data. If there is other transmission in the channel, the UE or the eNB postpones a transmission. Hereafter, the term LAA device may refer to an eNB or a UE operating on an LAA carrier.

There are at least two listen-before-talk (LBT) protocols that may meet the European telecommunication standards institute (ETSI) regulatory requirements. In one example, an LBT protocol is used for a frame-based equipment. In another example, an LBT protocol is used for a load-based equipment.

Figure 7:
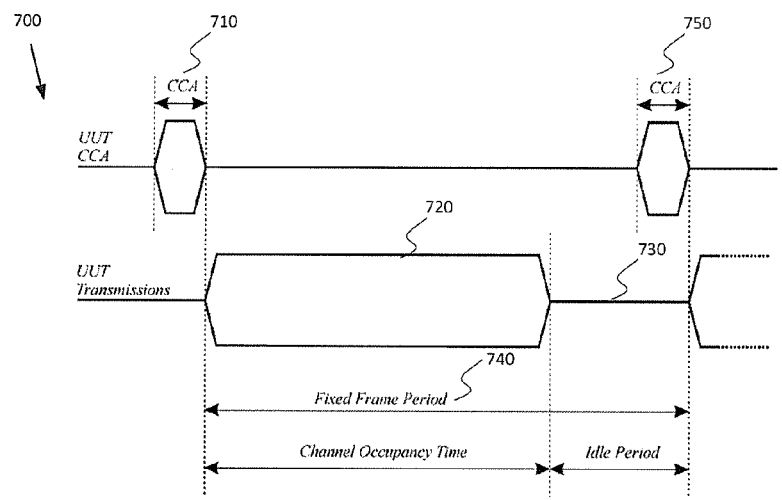
FIG. 7 illustrates an example timing alignment for a frame-based equipment (FBE) according to embodiments of the present disclosure.

FIG. 7 illustrates an example timing alignment for a frame-based equipment (FBE) 700 according to embodiments of the present disclosure. An embodiment of the timing alignment for the frame-based equipment (FBE) 700 shown in FIG. 7 is for illustration only. Other embodiments may be used without departing from the scope of the present disclosure.

As illustrated in FIG. 7, before an LAA device starts a transmission on a channel (or carrier), the LAA device performs a clear channel assessment (CCA) check 710 for a duration that is no less than 20 micro second (μs) (such as using energy detection). If the LAA device considers that the channel/carrier has been occupied, for example a channel energy level exceeds a threshold, the LAA device does not transmit data for a next FFP 740. In one example, if the LAA device considers that the channel/carrier is clear or idle, the LAA device transmits immediately with a total transmission duration in the range 1 ms to 10 ms 720. After the end of channel occupancy time, there may be a minimum idle period (such as 5%) of a channel occupancy time 730. Towards the end of the idle period, the LAA device may perform another CCA check 750.

Note that the embodiments described in the present disclosure are not limited to operation on unlicensed spectrum, but also on lightly licensed spectrum, licensed shared spectrum and the like.

Figure 8:
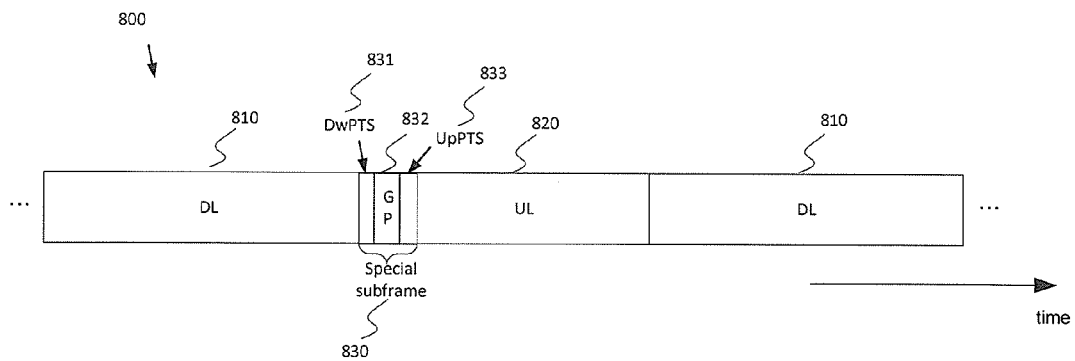
FIG. 8 illustrates an example time division duplex downlink-uplink (TDD-DL-UL) configuration for a carrier on an unlicensed frequency spectrum according to embodiments of the present disclosure.

FIG. 8 illustrates an example TDD-DL-UL configuration 800 for a carrier on an unlicensed band according to embodiments of the present disclosure. An embodiment of the TDD-DL-UL configuration 800 for a carrier on an unlicensed band shown in FIG. 8 is for illustration only. Other embodiments may be used without departing from the scope of the present disclosure.

For a TDD network operating on an unlicensed frequency spectrum, a carrier on the unlicensed frequency spectrum may be assumed to be a DL by default, but the carrier may be assigned or configured as a UL by the TDD network for a block of time.

As illustrated in FIG. 8, during a DL period 810, a base station (such as eNB) sends signals to UEs. The base station contends with neighbor base station(s) for a channel access according to an LBT protocol. In one example, a base station transmits signals in a discontinuous manner. During a UL period 820, a UE contends with neighbor UE(s) for a channel access according to an LBT protocol. In another example, a UE transmits signals in a discontinuous manner.

Duration of a DL period 810 is configurable depending on a need of a network. In one embodiment, the duration of the DL period 810 is several subframes, for example, one frame (10 ms) or multiple frames (10s or 100s of ms). Similarly, the duration of a UL period 820 is configurable and separated from a DL configuration, for example based on UEs' buffer status report and/or network scheduling decision. In another embodiment, the duration of a UL period 820 is several subframes, one frame, or multiple frames.

A guard period 832 is inserted into after a DL period 810, but before a UL period 820, to allow for a UL timing advance. In one example, the guard period 832 is a part of a special subframe (1 ms) 830 that also contains DwPTS 831 and UpPTS 833. In another example, the guard period 832 is 1 ms, in which case there is no DwPTS 831 and UpPTS 833. In one embodiment, a special subframe 830 is modified such that there is the DwPTS 831 and the guard period 832 (such as the UpPTS 833 doesn't exist) in which case the DwPTS 831 is lengthened and the guard period 832 is located at the end of the special subframe 830.

If a deployment scenario involves multiple LAA cells or multiple LAA operators, a DL and a UL configuration of a cell needs to be conveyed to neighboring cells in order to avoid DL-UL interference. In one embodiment, messages about the DL and UL configurations are exchanged over a backhaul network (such as X2 interface). In another embodiment, messages about the DL and UL configurations are broadcast by a cell (such as an eNB) over a broadcast channel (such as a broadcast channel for LAA system information) on the unlicensed spectrum, which can be acquired by other cells within range. For example, in system frame numbers (SFNs) of neighboring cells are exchanged through an X2 interface or are signaled using a broadcast channel, a starting time position of a UL block is signaled by an SFN offset and a subframe offset. In addition, a periodicity of the UL block occurrence is signaled.

For an asynchronous LAA network deployment (such as neighboring LAA cells are not synchronized in time) includes multiple operators' deployment scenarios. Timing between multiple cells at transmitters and receivers may not be aligned in an SFN, a radio frame, a subframe or an OFDM symbol. To avoid DL-to-UL interference and UL-to-DL interference due to a timing misalignment, guard periods are inserted in between a DL period and a UL period. In one example, the guard period is 1 ms duration.

Figure 9:
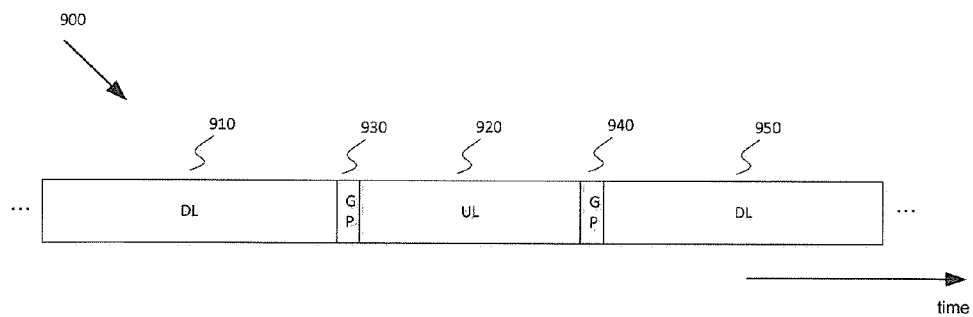
FIG. 9 illustrates another example TDD-DL-UL configuration for a carrier on an unlicensed frequency spectrum according to embodiments of the present disclosure.

FIG. 9 illustrates another example TDD-DL-UL configuration for a carrier on an unlicensed frequency spectrum 900 according to embodiments of the present disclosure. An embodiment of the TDD-DL-UL configuration for a carrier on an unlicensed frequency spectrum 900 shown in FIG. 9 is for illustration only. Other embodiments may be used without departing from the scope of the present disclosure.

As illustrated in FIG. 9, a first guard period 930 is present after a DL period 910, but before a UL period 920. A second guard period 940 that is the same or different duration as the first guard period 930 is present after the UL period 920, but before another DL period 950. An LAA TDD DL/UL configuration illustrated in FIG. 8 and FIG. 9 depend on a deployment scenario. The configuration can also be changed adaptively depending on the deployment scenario of a given time.

Figure 10:
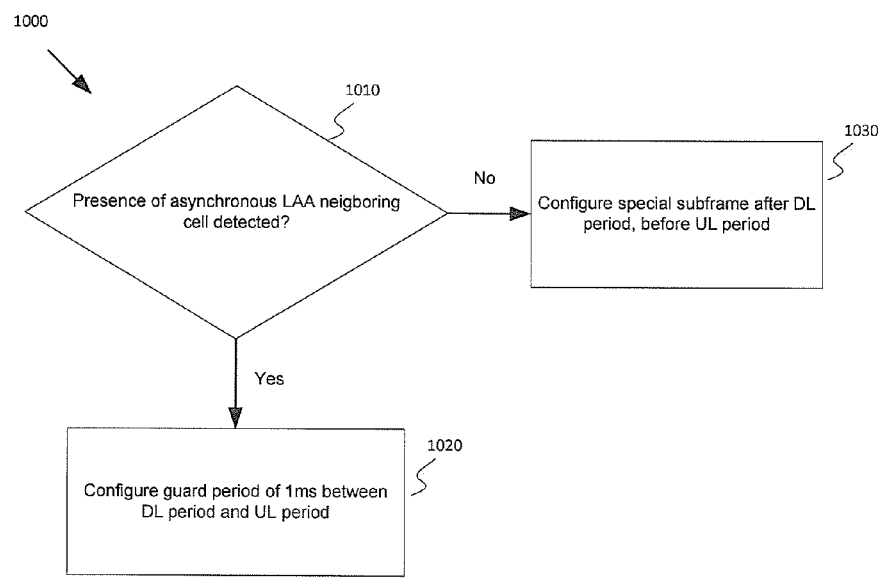
FIG. 10 illustrates an example of a method for a guard period configuration according to embodiments of the present disclosure.

FIG. 10 illustrates an example of a method 1000 for a guard period configuration according to embodiments of the present disclosure. An embodiment of the method 1000 for a guard period configuration shown in FIG. 10 is for illustration only. Other embodiments may be used without departing from the scope of the present disclosure.

As illustrated in FIG. 10, the method 1000 begins the process at step 1010, where the method 1000 detects neighboring cells. If one or more asynchronous LAA neighboring cells is detected using an X2 interface messaging or over-the-air network listening, the method 1000 configures a guard period (such as 1 ms) between a DL period and a UL period, and between a UL period and a DL period, at step 1020. If the asynchronous LAA neighboring cell is not detected at step 1010, the method 1000 configures a special subframe (or a guard period) immediately after a DL period and before a UL period at step 1030.

A set of DL-UL block patterns (such as LAA TDD DL-UL configurations) may be predefined. In one embodiment, the LAA TDD DL-UL configurations is configured based on a conventional LTE TDD DL-UL configurations except that a time unit number (TUN) is not 1 ms but a larger time unit (such as 10 ms, 20 ms, 50 ms, 100 ms or configurable by the network). Table 2 shows LAA DL-UL configurations.

As shown in Table 2, a TUN is 10 ms, D denotes a DL period of 10 ms, U denotes a UL period of 10 ms, and S denotes that a period of 10 ms begins with a DL part, followed by a guard period or a special subframe that is located towards the end of the period. In one embodiment, S denotes that a period of 10 ms contains a guard period or a special subframe, located at the beginning of the period, followed by a UL part for the remainder of the period. In another embodiment, an S period begins with a DL part, followed by a guard period or a special subframe in the middle of the S period that is then followed by a UL part.

TABLE 2

| LAA TDD DL-UL Configuration | DL-to-UL Switch-point periodicity | Time unit number (TUN) | | | | | | | | | |
|---|---|---|---|---|---|---|---|---|---|---|---|
| | | 0 | 1 | 2 | 3 | 4 | 5 | 6 | 7 | 8 | 9 |
| 0 | 5 × TUN | D | S | U | U | U | D | S | U | U | U |
| 1 | 5 × TUN | D | S | U | U | D | D | S | U | U | D |
| 2 | 5 × TUN | D | S | U | D | D | D | S | U | D | D |
| 3 | 10 × TUN | D | S | U | U | U | D | D | D | D | D |
| 4 | 10 × TUN | D | S | U | U | D | D | D | D | D | D |
| 5 | 10 × TUN | D | S | U | D | D | D | D | D | D | D |
| 6 | 5 × TUN | D | S | U | U | U | D | S | U | U | D |

In another embodiment, a predefined set of LAA TDD DL-UL configurations is shown in Table 3. As shown in Table 3, a TUN is 10 ms, D denotes a DL period of 10 ms, U denotes a UL period of 10 ms. A guard period (such as 1 ms) is present in between the DL period and the UL period. In such embodiment, the guard period is located at the end of the period that is labelled as G. In yet another embodiment, the guard period is located at the beginning of a period, in which case the period marked with G is the next one to the right of those marked in Table 3.

TABLE 3

| LAA TDD DL-UL Configuration | Time unit number (TUN) | | | | | | | | | |
|---|---|---|---|---|---|---|---|---|---|---|
| | 0 | 1 | 2 | 3 | 4 | 5 | 6 | 7 | 8 | 9 |
| 0 | D | D (G) | U | U | U (G) | D | D (G) | U | U | U (G) |
| 1 | D | D (G) | U | U (G) | D | D | D (G) | U | U (G) | D |
| 2 | D | D (G) | U (G) | D | D | D | D (G) | U (G) | D | D |
| 3 | D | D (G) | U (G) | U | U (G) | D | D | D | D | D |
| 4 | D | D (G) | U | U (G) | D | D | D | D | D | D |
| 5 | D | D (G) | U (G) | D | D | D | D | D | D | D |
| 6 | D | D (G) | U (G) | U | U (G) | D | D (G) | U | U (G) | D |

In some embodiments, LAA DL-UL configurations are signaled to a UE, so that the UE is expected when DL and UL transmissions occur. During a UL period, the UE does not measure a carrier for radio resource management (RRM) or channel state information (CSI) feedback purposes. The UE also does not detect/receive DL transmission or monitor for downlink control channel. The DL-UL configuration can also be reconfigured by a network (such as eNB) according to an amount of UL traffic, for example as estimated from the UEs' buffer status report.

In such embodiments, if the current period is a DL period, the LAA DL-UL configuration signaling indicates an arrival of a UL period, for example immediately upon decoding of the signaling by the UE or at a predetermined time upon decoding of the signaling. Duration of the UL period is configured to the UE. After the configured duration has lapsed, the UE considers that the UL period has ended and a next DL period starts.

In some embodiments, an LAA DL-UL configuration signaling indicates the end of a UL period or the start of a DL period. In such embodiments, duration of the UL period depends on when the LAA DL-UL signaling to indicate the end of UL period is transmitted.

In some embodiments, default duration of a UL period is configured to the UE, however an LAA DL-UL configuration signaling indicates that the end of the UL period can override default duration and ends the current UL period. In some embodiments, an index of LAA TDD DL-UL configuration as shown in Table 2 and Table 3 are signaled to the UE.

The LAA DL-UL configuration information aforementioned can be transmitted in a broadcast signaling or a unicast signaling using an RRC signaling, a medium access control (MAC) signaling, or dynamic signaling based on a physical downlink control channel/enhanced physical downlink control channel (PDCCH/EPDCCH) signaling. In one example, a PDCCH/EPDCCH signaling for the LAA DL-UL configuration is adapted from an enhanced interference mitigation and traffic adaptation (eIMTA) TDD configuration signaling with a different radio network temporary identifier (RNTI) scrambling the PDCCH/EPDCCH. In this example, the LAA DL-UL configuration is included in a DL common control channel transmitted on the LAA SCell. In another example, the signaling for the LAA DL-UL configuration is transmitted on another serving cell such as the PCell or SCell on licensed carrier (such as SCell).

During a DL period, there may be short UL transmissions that do not require CCA immediately after or shortly after a DL transmission. The short UL transmission is used to send an uplink hybrid automatic request-acknowledgement (UL-HARQ-ACK), CSI, or uplink control information (UCI). The short UL transmission is configurable depending on a deployment scenario. For example, for a synchronous network (such as typical for a single operator deployment scenario), the short UL transmission is configured. With an inter-cell coordination, DL-UL interference is avoided or controlled. However, for an asynchronous network (such as typical for a multiple operators deployment scenario), the short UL transmission is not configured to avoid DL-UL interference between cells; UCI is sent on another the UL of another serving cell without the presence of asynchronous cells or cells of different operators.

During a UL period, there may be short DL transmissions, for example discovery signal transmission that is used by a UE for synchronization, RRM measurement or CSI measurement. In one embodiment, similar to the short UL transmission in a DL period, short discovery signal transmissions during the UL period is not configured to avoid DL-UL interference between cells, especially for an asynchronous network (such as a short discovery signal transmission is dropped by the base station or assumed not transmitted from the base station by the UE during the UL period). In another embodiment, a discovery signal transmission period (configured as discovery signal measurement timing configuration (DMTC)) is still short periodic duration of DL transmission opportunity embedded within a longer UL period for an asynchronous network. The DMTC occasions of asynchronous cells can be approximately aligned through coordination with each other. The asynchronous cells can attempt to transmit discovery signal as well as other DL physical channels (such as PDCCH/EPDCCH for UL grant during the DMTC occasions).

Figure 11:
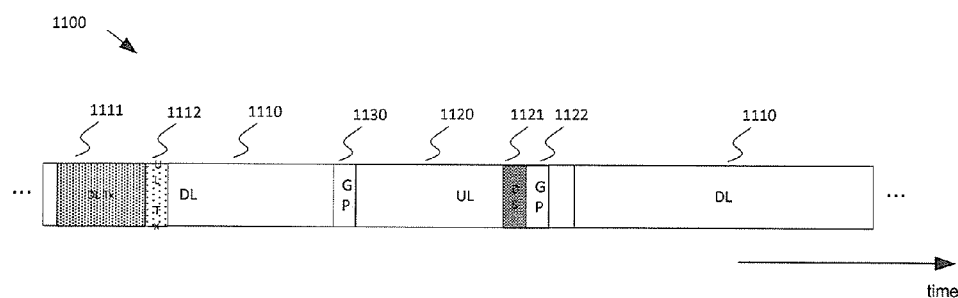
FIG. 11 illustrates an example short UL transmission and short DL transmission according to embodiments of the present disclosure.

FIG. 11 illustrates an example short UL transmission and short DL transmission 1100 according to embodiments of the present disclosure. An embodiment of the short UL transmission and short DL transmission 1100 shown in FIG. 11 is for illustration only. Other embodiments may be used without departing from the scope of the present disclosure.

As illustrated in FIG. 11, during a DL period 1110, after a DL transmission instance 1111 from a base station to a UE, there is a short UL transmission 1112 from the UE to the base station (such as 1 ms or 1 subframe). During a UL period 1120, there is a discovery signal transmission 1121. If the UL period 1120 continues on after the discovery signal transmission 1121, there is a guard period 1122 after the discovery signal transmission 1121 before the resumption of the UL period 1120.

A UE operating on an LAA carrier(s) performs an LBT procedure similar to an FBE protocol. An FFP is fixed or configurable by a network. For example, the FFP is configured from the range of 1 ms to 10 ms.

Figure 12:
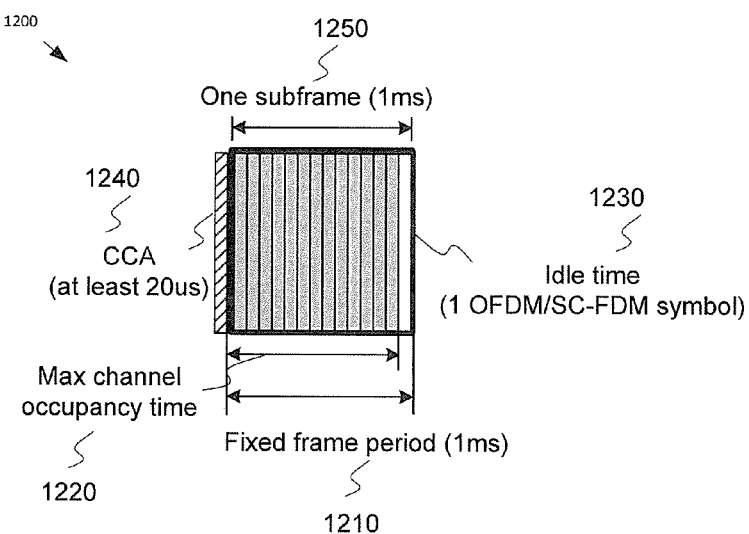
FIG. 12 illustrates an example fixed frame period (FFP) with a 1 millisecond (ms) subframe length according to embodiments of the present disclosure.

FIG. 12 illustrates an example FFP with a 1 ms subframe length 1200 according to embodiments of the present disclosure. An embodiment of the FFP with 1 ms subframe length 1200 shown in FIG. 12 is for illustration only. Other embodiments may be used without departing from the scope of the present disclosure.

Figure 13:
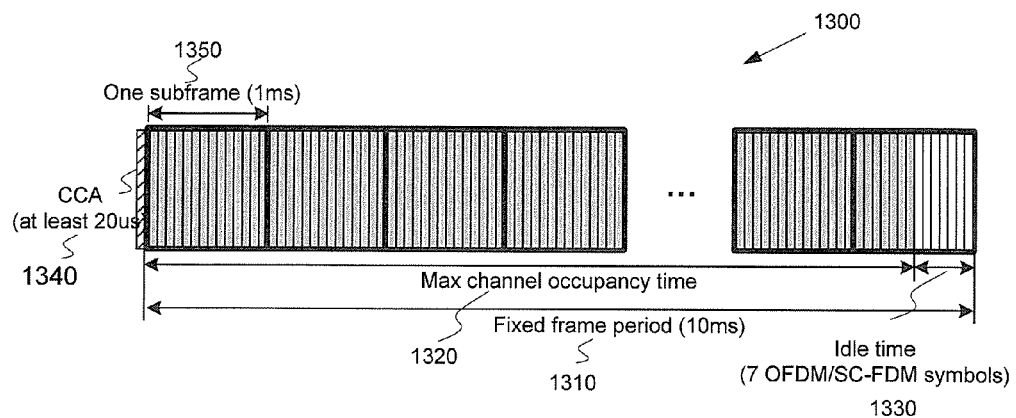
FIG. 13 illustrates an example FFP with a 10 ms subframe length according to embodiments of the present disclosure.

FIG. 13 illustrates an example FFP with a 10 ms subframe length according to embodiments of the present disclosure. An embodiment of the FFP with a 10 ms subframe length 1300 shown in FIG. 13 is for illustration only. Other embodiments may be used without departing from the scope of the present disclosure.

As illustrated in FIG. 12 and FIG. 13, before a UE transmits on a subframe 1250, 1350, the UE performs CCA of at least 20 μs 1240, 1340 before the start of the subframe 1250, 1350). If a channel is unoccupied, the UE transmits for up to a maximum channel occupancy time, which can be 13 single carrier frequency division multiplexing/OFDM (SC-FDM/OFDM) symbols 1220 when the FFP is 1 ms 1210, and can be 9.5 ms (such as 9.5 subframes) 1320 when the FFP is 10 ms 1310. The UE then stops transmission for the remaining time of the FFP, that is 1 SC-FDM/OFDM symbol 1230 when the FFP is 1 ms 1210, and is one slot (such as 0.5 subframes) 1320 when the FFP is 10 ms 1310.

If the channel is occupied, the UE skips the FFP and performs CCA just before the start of the next FFP. In one embodiment, a UE skips one subframe and performs CCA again just before the start of the next subframe that is within the same FFP for the FFP that is longer than one subframe. If the CCA then indicates the channel is unoccupied, the UE transmits during up to the remaining maximum channel occupancy time within the same FFP. However, if an intended channel occupancy time is longer than the remaining maximum channel occupancy time within the same FFP, the UE skips the current FFP and performs CCA just before the start of the next FFP. In another embodiment, a UE transmits for the remaining maximum channel occupancy time within the same FFP.

In one embodiment, FFP configuration information is configured and/or reconfigured by a higher layer signaling such as an RRC signaling or an MAC signaling. In another embodiment, FFP configuration information is included in a signaling of LAA TDD DL-UL configuration (such as in TDD system).

In one embodiment, FFP configuration information is configured and/or reconfigured by an L1 signaling such as PDCCH/EPDCCH signaling. In another embodiment, FFP configuration information is included in an L1 signaling of LAA TDD DL-UL configuration (such as in TDD system) such as that adapted from eIMTA L1 control signaling or in a LAA L1 common control channel. In yet another embodiment, the FFP configuration is included in a PDCCH/EPDCCH UL grant that schedules a UL transmission on an LAA carrier.

Figure 14:
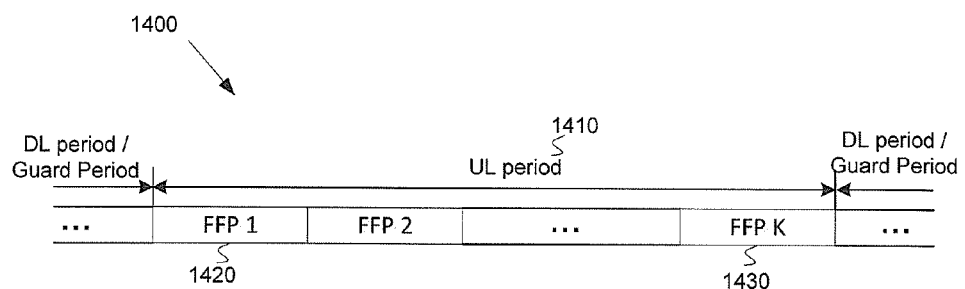
FIG. 14 illustrates an example FFP and UL period for TDD operation according to embodiments of the present disclosure.

FIG. 14 illustrates an example FFP and UL period for TDD operation 1400 according to embodiments of the present disclosure. An embodiment of the timing alignment for the FFP and UL period for TDD operation 1400 shown in FIG. 14 is for illustration only. Other embodiments may be used without departing from the scope of the present disclosure.

A UL period as aforementioned above comprises of an integer multiple of FFPs as illustrated in FIG. 14. If a last FFP of the UL period is longer than the remaining duration of the UL period, a portion of the last FFP is truncated to match the remaining duration of the UL period.

As illustrated in FIG. 14, a UL period 1410 includes a number of FFPs (such as FFP 1 to FFP K). The last FFP (such as FFP K) 1430 does not have the same duration as the other FFP within the UL period 1410, if it is truncated. If the UE knows the start time and the end time of a UL period 1410, the UE determines an FFP start times as $P \times k + t_0$, where $k \in [0, \ldots K-1]$, $t_0$ is the start time of the current UL period and P is the configured FFP duration. The UE determines the first available CCA slot and the first available FFP by determining the first available k.

A reconfigurability of an FFP implies that the FFP is different for different UL period. This is beneficial for a network to adapt to traffics or interference conditions of a channel. However, a restriction is imposed such the FFP does not change within a UL period (with the exception of the last FFP if truncation occurs). Accordingly, upon receiving a FFP reconfiguration message, a UE assumes that a new FFP configuration takes effect at a next UL period. For a FDD system, a UL period is also defined and one of the UL period's functions is to indicate a boundary when an FFP duration changes.

Figure 15:
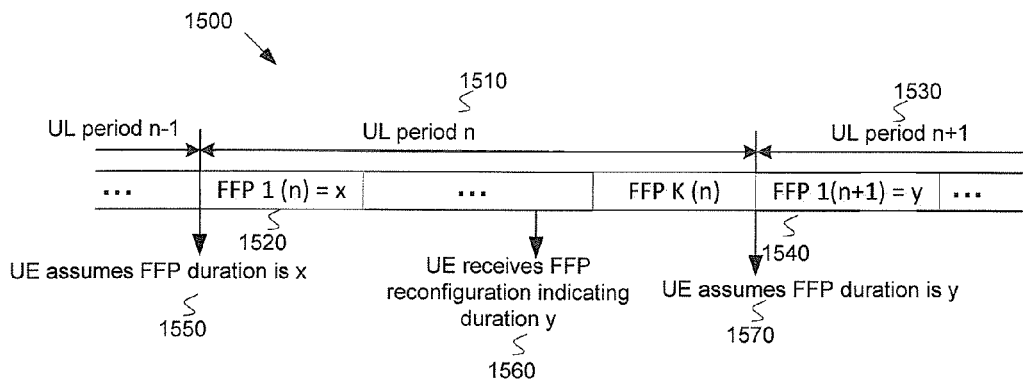
FIG. 15 illustrates an example reconfiguration of FFP duration according to embodiments of the present disclosure.

FIG. 15 illustrates an example reconfiguration of FFP duration 1500 according to embodiments of the present disclosure. An embodiment of the reconfiguration of FFP duration 1500 shown in FIG. 15 is for illustration only. Other embodiments may be used without departing from the scope of the present disclosure.

As illustrated in FIG. 15, an FFP1 1520 for a UL period n 1510 is configured with duration x 1550. Upon receiving an FFP reconfiguration message indicating duration y 1560 during the UL period n 1510, a UE assumes FFP duration of y starting from the first FFP 1540 of UL period n+1 1530.

A UL transmission on a LAA carrier is scheduled by a UL grant. Upon reception of a UL grant that is in a UL period or a DL period, a UE performs CCA check on the first available CCA slot and transmits in the first available FFP if a channel is unoccupied. If the channel is occupied, the UE tries CCA check again on a next available CCA slot.

In one embodiment, a CCA slot is available before a next FFP. In another embodiment, a CCA slot is available before a next subframe within the same FFP. Upon the end of the current UL period, a UL grant is discarded by a UE if the corresponding transmit block (TB) has not been successfully transmitted that is either caused by unavailability of the channel or a negative acknowledgement (NACK) received at the UE after the TB transmission (such as corresponding to unsuccessful reception by an eNB).

In another embodiment, a UE attempts transmission at a next UL period with the same UL grant, unless a new UL grant has been received, in which case the new UL grant applies. Whether or not the UE discards or keeps the UL grant for the next UL period depends on how soon the next UL period is available. For example, the next UL period arrives immediately after the end of the current UL period for an FDD system but the next UL period is 10 or 10s or 100s of ms later for a TDD system. In such example, the UE discards the UL grant for the TDD system, but keeps the UL grant for the FDD system.

In yet another embodiment, upon the end of the first available FFP, a UL grant is discarded by a UE if a corresponding TB has not been successfully transmitted. A new UL grant is required for a transmission in a next available FFP. In yet another embodiment, a UE attempts transmission at a next available FFP with the same UL grant, unless a new UL grant has been received, in which case the new UL grant applies.

Given an FFP configuration, a UE determines a maximum possible channel occupancy time. For example, if the FFP configuration is 1 ms and 10 ms, the maximum channel occupancy time can be 13 SC-FDM/OFDM symbols and 9.5 subframes, respectively. Additional control information is also included in a UL grant for a LAA carrier. In one example, an actual channel occupancy time by the UE is included in the UL grant that is in terms of a number of UL subframes. A number of transport blocks scheduled by the UL grant is one for the multiple subframe transmission (or two if uplink multiple-input multiple-output (UL-MIMO) is configured). In another example, there is one transport block for each UL subframe, in which case channel occupancy time control information is also be in terms of a number of UL HARQ processes (such as one HARQ process for one UL subframe), or a number of transport blocks (such as one transport block for one UL subframe for non UL-MIMO) allocated for a UL transmission.

To achieve DCI signaling overhead reduction, an uplink multiple coding scheme (UL MCS) and a UL resource allocation (such as resource block assignment and demodulation reference signal (DM-RS) cyclic shift and orthogonal cove code (OCC) index) are common for all the UL subframes/HARQ processes/transport blocks allocated. When a channel occupancy time indicated in a UL grant (M ms) is longer than the remaining duration of UL period (N ms), the whole UL grant is discarded or only the first N HARQ processes or transport blocks are transmitted, and the remaining M-N HARQ processes or transport blocks is either discarded or transmitted in a next UL period.

A HARQ-ACK for multiple transport blocks scheduled by a single UL grant is bundled such that one HARQ-ACK bit (and one physical hybrid-ARQ indicator channel (PHICH) resource) is used to indicate if all transport blocks were successfully received by a network or if the transport blocks need to be retransmitted.

In one embodiment, if a PHICH for an LAA UL transmission is transmitted on another serving cell (such as on licensed carrier), there is an additional PHICH group for a LAA UL carrier. For example, the PHICH resource is identified by the index pair ($n_{PHICH}^{group}$, $n_{PHICH}^{seq}$) where $n_{PHICH}^{group}$ is the PHICH group number and $n_{PHICH}^{seq}$ is an orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

where $I_{PHICH}=2$ or a larger number corresponding to an offset for the PHICH group of LAA carrier.

In case of multiple LAA UL carriers aggregation, there is different $I_{PHICH}$ value for different UL carrier. The parameters $I_{PRB\_RA}$, $n_{DMRS}$, $N_{PHICH}^{group}$ and $N_{SF}^{PHICH}$ are defined in LTE specification.

In another embodiment, a granularity of a HARQ-ACK bundling, and thus a number of PHICH resources corresponding to UL transmissions scheduled by a single UL grant, is configured by a network. For example there are m HARQ-ACK bits, presenting m groups of transport blocks scheduled by the network with a single UL grant. The HARQ-ACK bits for different bundle are transmitted in separate DL subframe, and the PHICH resource for each DL subframe is the same.

In yet another embodiment, HARQ-ACK bits for multiple or all groups are transmitted in the same DL subframe. In this case, separate $I_{PHICH}$ value is assigned for different HARQ-ACK group.

When there are asynchronous LAA cells in the neighborhood, for example because of multiple operators' networks deployed in the same geographical area, an FFP, a CCA slot, and a UL period of different cells are not aligned. In the worst case, the misalignment parameters persistently prevent channel access by a LAA device.

In some embodiments, a UL channel access is further randomized by imposing that a channel is idle from CCA for a number of times s before a UE is allowed to transmit. The number s is randomly chosen from a range of values (such as from 1 to S (S>)) by each cell or each network of synchronized cells (such as each operator) and is signaled to the UE as an initial state of a backoff counter stored at the UE. The number is counted down by the UE if the channel is idle by the UE, but the number is kept the same if the channel is occupied. When the number is decremented to zero, the UE is allowed to transmit according to a UL grant configuration. After one or more UEs have completed transmissions, a new randomly chosen number by the network is used for a next UL transmission. A new random number is drawn for each UL period and signaled to the UEs.

In some embodiments, a new random number is drawn for each FFP and signaled to UEs. A signaling of s to the UE is performed by a higher layer signaling (such as an RRC or a MAC signaling), for example the signaling is included in an LAA TDD DL-UL configuration signaling in a TDD system. The signaling of s is also signaled to the UE via an L1 control signaling (such as PDCCH/EPDCCH) such as the UL grant or the L1 control signaling of an LAA TDD DL-UL configuration. The signaling of s is also configurable by a network since not all deployment scenarios require the signaling of s (such as a single operator synchronized network). For deployment scenario that does not require a backoff counter, s is not signaled or assumed to take a value 1 or s=1 is always signaled.

In one embodiment, a random number s is chosen by a UE from a range of values [1, S] configured by a network (such as S is configured by the network by a higher layer signaling). The value S is either predefined or coordinated via an X2 interface or via an operation administration management (OAM) among asynchronous cells.

Figure 16:
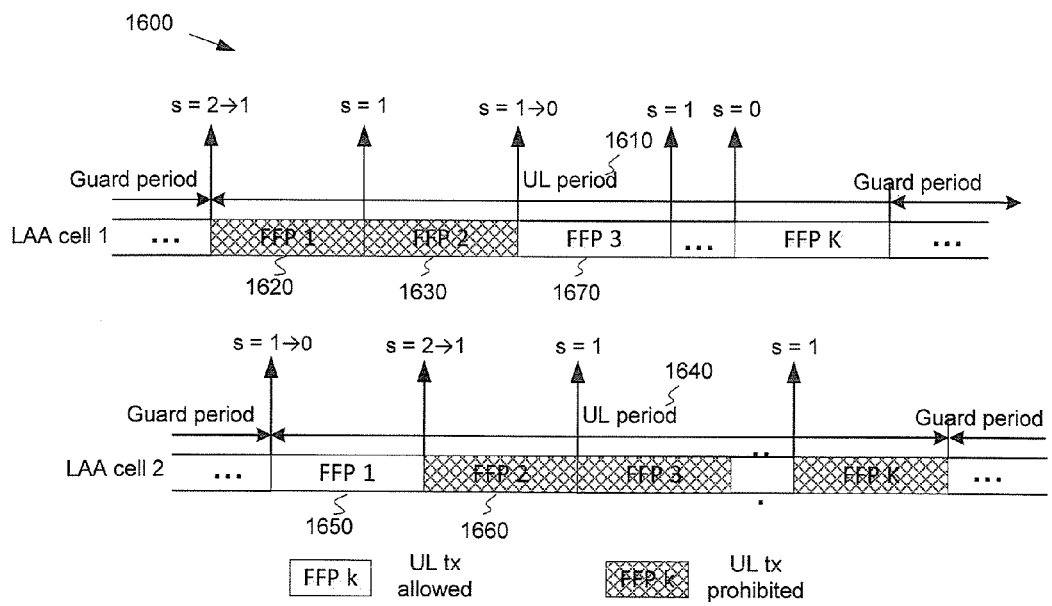
FIG. 16 illustrates an example FFP with a backoff counter according to embodiments of the present disclosure.

FIG. 16 illustrates an example FFP with a backoff counter 1600 according to embodiments of the present disclosure. An embodiment of the FFP with a backoff counter 1600 shown in FIG. 16 is for illustration only. Other embodiments may be used without departing from the scope of the present disclosure.

As illustrated in FIG. 16, a UL period and the FFP timing for an LAA cell 1 1610 and an LAA cell 2 1640 are not synchronized but UEs in the LAA cell 1 and the LAA cell 2 are within energy detection range of each other. The LAA cell 1 draws s=2 and signals to a (such as a UE 1) before the UL period 1610, and the LAA cell 2 draws s=1 and signals to a UE (such as UE 2) before the UL period 1640. The UE 1 of the LAA cell 1 decrements a backoff counter from 2 to 1 after CCA for an FFP 1 since the FFP is in an idle state. As the counter value is not zero, the UE 1 is not allowed to transmit. In one embodiment, the UE 2 of the LAA cell 2 decrements a backoff counter from 1 to 0 after CCA for FFP 1 1650 since the FFP 1 is in an idle state. As the counter value is zero, the UE transmits on the FFP 1 1650. Due to the UE 2's transmission, the UE 1 detects that a channel is occupied after CCA for the FFP 2 1630 and keeps the counter value to be 1. The UE 1 is prohibited from transmitting in the FFP 2 1630.

After the UE 2 has completed transmission in the FFP 1 1650, a new s value is signaled, that is 2. As CCA for the FFP 2 1660 is not occupied, the counter value is decremented from 2 to 1, however the UE 2 does not transmit on the FFP 2 1660 since the counter is still greater than zero. The UE 1 then performs CCA check for an FFP 3 1670, finds it to be an idle state, decrements a counter to zero and transmit signals.

In some embodiments, UL subframes that are available for UL transmissions are restricted by a network (such as eNB). For example, the first half of a UL period is configured to be available for an UL transmission. In contrast, the second half of the UL period is prohibited from the UL transmission that is utilized by UEs served by a neighboring asynchronous cell for the UL transmission. In one embodiment, one FFP for every w FFPs is available for a UL transmission (such as the first FFP for every w FFPs). A UL subframe restriction is signaled to a UE via a higher layer signaling in a form of bitmap. For example, if there are R1 UL subframes in a UL period, there is a bitmap of R1 bits signaled by the network, where a bit value of 1 represents that a corresponding UL subframe is available for the UL transmission. In another example, if there are R2 FFPs in a UL period, there is a bitmap of R2 bits signaled by the network, where a bit value of 1 represents that a corresponding FFP is available for a UL transmission. The UL resource restrictions are coordinated via an X2 interface or via operation and Management (O&M) among asynchronous cells or via over-the-air broadcast channel.

Figure 17:
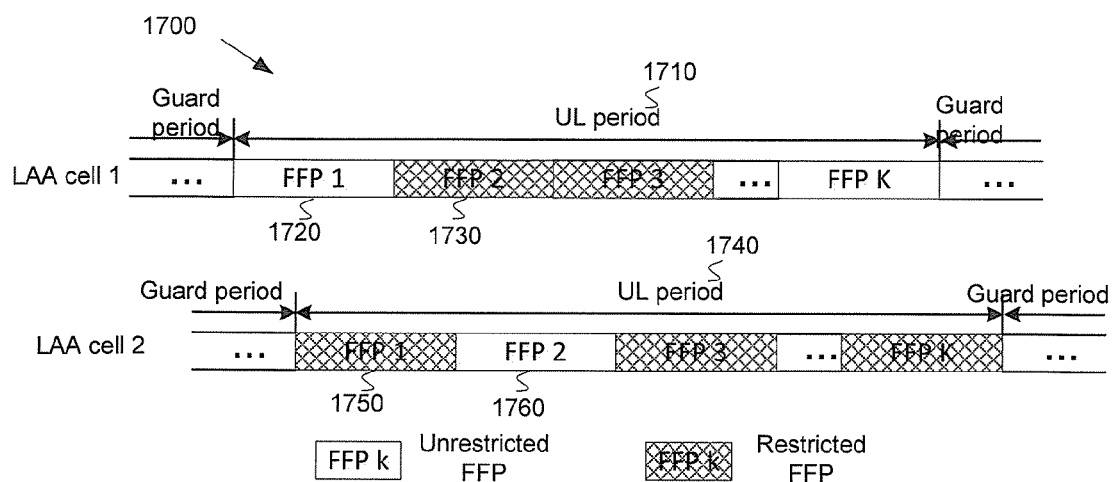
FIG. 17 illustrates an example restricted FFP according to embodiments of the present disclosure.

FIG. 17 illustrates an example restricted FFP 1700 according to embodiments of the present disclosure. An embodiment of the restricted FFP 1700 shown in FIG. 17 is for illustration only. Other embodiments may be used without departing from the scope of the present disclosure.

As illustrated in FIG. 17, a UL period and the FFP timing for an LAA cell 1 1710 and an LAA cell 2 1740 are not synchronized. As a result of inter-cell coordination, the LAA cell 1 configures an FFP 2 1730 and an FFP 3 to be restricted FFPs and inform UEs. In contrast, the LAA cell 2 configures an FFP 1 1750 and an FFP 3 to be restricted FFPs and inform UEs. The UEs of the LAA cell 1 performs CCA before the FFP 1 1730 and transmit in the FFP 1 1750 if a channel is in an idle state. In contrast, the UEs of the LAA cell 2 perform CCA before the FFP 2 1760 and transmit in the FFP 2 if a channel is in an idle state. CCA does not need to be performed by the UE before a restricted FFP, such as the FFP 2 1720 of the LAA cell 1 and the FFP 1 1750 of the LAA cell 2.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. A user equipment (UE) comprising:
   at least one processor configured to:
      perform a listen before talk (LBT) procedure before transmitting UL data on the at least one licensed assisted access (LAA) carrier; and
   a transceiver configured to:
      receive a predefined downlink and uplink (DL-UL) subframe configuration from an eNodeB (eNB), wherein the eNB cooperates with at least one neighbor eNB that belongs to an asynchronous LAA cell operating on the at least one LAA carrier;
      transmit the UL data in accordance with the LBT procedure based on the DL-UL subframe configuration.

2. The UE of claim 1, wherein the DL-UL subframe configuration includes a guard period.

3. The UE of claim 1, wherein the transceiver is further configured to receive the predefined DL-UL subframe configuration including a special subframe from the eNB cooperating with the at least one neighbor eNB that belongs to a synchronous LAA cell operating in the at least one LAA carrier.

4. The UE of claim 3, wherein the transceiver is further configured to:
   transmit a short UL data during a DL period configured by the DL-UL subframe configuration after receiving a DL data; and
   receive a short DL data during a UL period configured by the DL-UL subframe configuration after transmitting the UL data.

5. The UE of claim 1, wherein:
   the at least one processor further configured to:
      perform a clear channel assessment (CCA) on a first available CCA slot after receiving a UL grant; and
      discard the UL grant from a first available fixed frame period (FFP) when the UL data is not successfully transmitted to the eNB; and
   the transceiver is further configured to transmit the UL data in the first available FFP when a UL channel is not occupied by at least one neighbor UE.

6. The UE of claim 1, the transceiver is further configured to:
   receive a value of a random backoff counter from the eNB; and
   transmit the UL data in accordance with the value of the random backoff counter when the UL channel is occupied.

7. The UE of claim 1, the transceiver is further configured to receive a DL message including a restriction configuration such that a first half portion of a UL subframe is configured to transmit the UL data and a second half portion of the UL subframe is configured not to transmit the UL data.

8. An eNodeB (eNB) comprising:
at least one processor configured to:
 detect at least one neighbor eNB that belongs to an asynchronous licensed assisted access (LAA) cell operating on at least one LAA carrier;
 generate a predefined downlink and uplink (DL-UL) subframe configuration including a guard period, wherein the predefined DL-UL subframe is determined by coordinating between the eNB and the at least one neighbor eNB through an X2 interfaces; and
a transceiver configured to:
 transmit the predefined DL-UL subframe configuration to at least one user equipment (UE); and
 receive UL data in accordance with the predefined DL-UL subframe configuration from the at least one UE.

9. The eNB of claim 8, wherein:
the at least one processor further configured to:
 detect at least one neighbor eNB that belongs to a synchronous LAA cell operating on at least one LAA carrier;
 generate a predefined DL-UL subframe configuration including a special subframe, wherein the predefined DL-UL subframe is determined by coordinating between the eNB and the at least one neighbor eNB through the X2 interfaces; and
the transceiver further configured to:
 transmit the predefined DL-UL subframe configuration to at least one user equipment (UE); and
 receive UL data in accordance with the predefined DL-UL subframe configuration from the at least one UE.

10. The eNB of claim 9, wherein the transceiver is further configured to:
receive a short UL data during a DL period configured by the DL-UL subframe configuration after transmitting a DL data; and
transmit a short DL data during a UL period configured by the DL-UL subframe configuration after receiving the UL data.

11. The eNB of claim 8, wherein the transceiver is further configured to:
transmit a value of a random backoff counter to the at least one UE; and
receive the UL data in accordance with the value of the random backoff counter when the UL channel is occupied.

12. The eNB of claim 8, wherein:
the at least one processor is further configured to generate a DL message including a restriction configuration such that a first half portion of a UL subframe is configured to transmit the UL data and a second half portion of the UL subframe is configured not to transmit the UL data; and
the transceiver is further configured to transmit the DL message including the restriction configuration to the at least one UE using an RRC signaling, a MAC signaling, or an L1 signaling.

13. The eNB of claim 8, wherein the transceiver is further configured to receive the UL data in a first available FFP when a UL channel is not occupied by at least one neighbor UE.

14. A method for efficient data transmission in a wireless communication system, the method comprises:
receiving, by a user equipment (UE), a predefined downlink and uplink (DL-UL) subframe configuration from an eNodeB (eNB), wherein the eNB cooperates with at least one neighbor eNB that belongs to an asynchronous licensed assisted access (LAA) cell operating on at least one LAA carrier;
performing, by the UE, a listen before talk (LBT) procedure before transmitting UL data in the at least one LAA carrier; and
transmitting the UL data in accordance with the LBT procedure based on the DL-UL subframe configuration.

15. The method of claim 14, wherein the DL-UL subframe configuration includes a guard period.

16. The method of claim 14, further comprising:
receiving the predefined DL-UL subframe configuration including a special subframe from the eNB, wherein the eNB cooperates with the at least one neighbor eNB belongs to a synchronous LAA cell operating on the at least one LAA carrier.

17. The method of claim 16, further comprising:
transmitting a short UL data during a DL period configured by the DL-UL subframe configuration after receiving a DL data; and
receiving a short DL data during a UL period configured by the DL-UL subframe configuration after transmitting the UL data.

18. The method of claim 14, further comprising:
performing a clear channel assessment (CCA) on a first available CCA slot after receiving a UL grant;
transmitting the UL data in a first available fixed frame period (FFP) when a UL channel is not occupied by at least one neighbor UE; and
discarding the UL grant from the first available FFP when the UL data is not successfully transmitted to the eNB.

19. The method of claim 14, further comprising:
receiving a value of a random backoff counter from the eNB; and
transmitting the UL data in accordance with the value of the random backoff counter when the UL channel is occupied.

20. The method of claim 14, further comprising:
receiving a DL message including a restriction configuration such that a first half portion of a UL subframe is configured to transmit the UL data and a second half portion of the UL subframe is configured not to transmit the UL data.

* * * * *